(12) United States Patent
Boville

(10) Patent No.: US 7,607,502 B2
(45) Date of Patent: Oct. 27, 2009

(54) DEVICE FOR FIXING A HOUSING, IN PARTICULAR OF A MOTOR-VEHICLE BATTERY, TO A SUPPORT

(75) Inventor: Daniel Boville, Paris (FR)

(73) Assignee: A. Raymond & Cie, Grenoble (FR)

( * ) Notice: Subject to any disclaimer, the term of this patent is extended or adjusted under 35 U.S.C. 154(b) by 415 days.

(21) Appl. No.: 10/550,966

(22) PCT Filed: Mar. 11, 2004

(86) PCT No.: PCT/EP2004/002485

§ 371 (c)(1),
(2), (4) Date: Oct. 30, 2006

(87) PCT Pub. No.: WO2004/085208

PCT Pub. Date: Oct. 7, 2004

(65) Prior Publication Data

US 2007/0170323 A1    Jul. 26, 2007

(30) Foreign Application Priority Data

Mar. 28, 2003    (DE) ............................... 103 14 030

(51) Int. Cl.
*B60R 16/04*    (2006.01)
(52) U.S. Cl. ................. 180/68.5; 429/100; 429/186; 267/164
(58) Field of Classification Search ................. 180/68.5; 429/96, 100, 163, 186; 267/164, 165
See application file for complete search history.

(56) References Cited

U.S. PATENT DOCUMENTS

| | | | | |
|---|---|---|---|---|
| 1,881,461 A | * | 10/1932 | Furtney | ...................... 439/500 |
| 4,793,601 A | * | 12/1988 | Wild et al. | ................... 267/165 |
| 5,116,699 A | * | 5/1992 | Miyajima | ................... 429/100 |
| 5,771,149 A | * | 6/1998 | Osaki et al. | .............. 361/306.1 |
| 5,814,422 A | | 9/1998 | Vezina | |

(Continued)

FOREIGN PATENT DOCUMENTS

EP    1069632 A    1/2001

(Continued)

*Primary Examiner*—Christopher P Ellis
*Assistant Examiner*—John D. Walters
(74) *Attorney, Agent, or Firm*—Tarolli, Sundheim, Covell & Tummino, LLP

(57) ABSTRACT

The invention relates to a device for fixing a housing (1), in particular of a motor-vehicle battery to a carrier plate (3), permitting the housing (1) to be fixed rapidly without complex manipulation and the aid of a tool to the plate (3). To achieve this, a spring-loaded curved fixing part (10) is inserted under tension between the wall of the housing (1) that is placed on the carrier plate (3) and a retaining edge (4) that projects vertically from the carrier plate (3). The fixing part (10) is preferably curved in a U-shape and comprises a hook-shaped section (27) that grips the base of the housing (1) by means of an opening (7) in the carrier plate (3), in addition to a wedge-shaped surface (12) that co-operates with the retaining edge (4) and engagement elements (17, 26) that secure the housing in position.

8 Claims, 2 Drawing Sheets

U.S. PATENT DOCUMENTS

Figure 1:
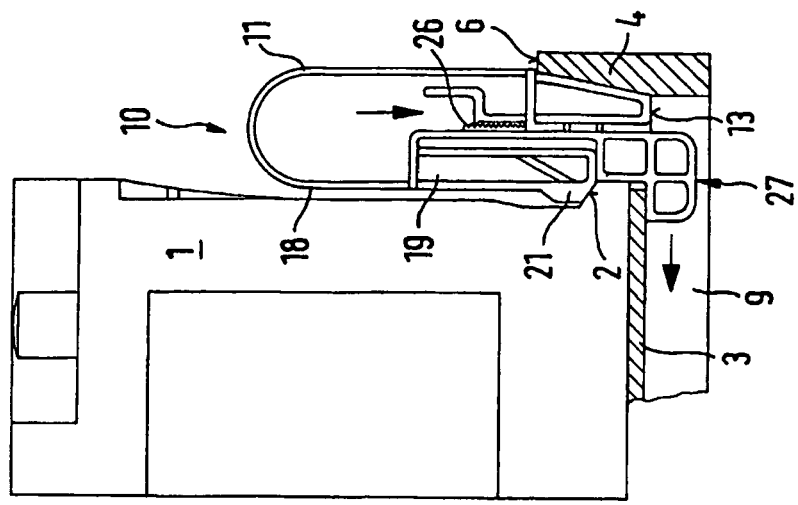

| | | |
|---|---|---|
| 6,161,810 A | 12/2000 | Crow et al. |
| 6,224,998 B1 * | 5/2001 | Brouns et al. ............... 429/100 |
| 6,521,371 B1 * | 2/2003 | Lavanture ................... 429/100 |
| 6,880,657 B2 * | 4/2005 | Schneider et al. .......... 180/68.5 |
| 7,389,841 B2 * | 6/2008 | Boville ...................... 180/68.5 |

FOREIGN PATENT DOCUMENTS

| | | |
|---|---|---|
| FR | 2761422 A | 10/1998 |
| FR | 2779010 A | 11/1999 |

* cited by examiner

DEVICE FOR FIXING A HOUSING, IN PARTICULAR OF A MOTOR-VEHICLE BATTERY, TO A SUPPORT

The invention relates to a device for fixing a housing, in particular of a motor vehicle battery, to a carrier plate.

Housings of motor vehicle batteries have an essentially cubical shape. They are usually placed on a carrier plate with one end that is curved in spring-loaded fashion and grips behind a step on a side wall of the battery housing. The opposite side wall of the housing also exhibits a step, and the carrier plate on this side projects beyond the housing base. To fasten the housing on the carrier plate, one end of an S-shaped leaf spring is brought into place on this step as a fixing flange, while its other end rests on the protruding carrier plate. A bolt that passes through the flat middle section of the leaf spring and through the protruding section of the carrier plate is secured with a locknut. This type of fixing is cumbersome, requires a series of manipulations and can only be performed by using a tool, and if, for example, replacement of the battery becomes necessary, it must be loosened again; the amount of time spent in order to do that is substantial, and represents an additional cost factor. The recycling of the flanges and bolts in accordance with European guidelines represents an additional problem.

The object of the invention is to provide a device for fixing a housing, in particular of a motor vehicle battery to a carrier plate, which permits the housing to be fixed to the support without complex manipulation and without the aid of a tool, and to be removed just as easily and quickly. If possible, no discarded parts should occur with repeated exchange of the housing or battery.

According to the invention this is achieved in that a spring-loaded curved retainer is inserted under tension between the wall of the housing that is placed on the carrier plate, and a retaining edge that projects vertically from the carrier plate. This can be done without complex manipulation and without the aid of a tool. The spreading action that the tensioned fixing part exerts on the housing and the retaining edge of the carrier plate holds the housing on the carrier plate.

The fixing part is preferably curved in a U-shape from a springy material. Following the insertion of the fixing part between the housing wall and the retaining edge of the carrier plate, one leg of the U lies against the retaining edge and the second leg of the U lies against the housing wall under spreading tension.

According to a preferred embodiment of the invention, the retaining edge exhibits a beveled inner surface so that it narrows towards the top in wedge-like fashion. The free end of the first leg of the U, which comes to lie against the retaining edge, is suitably tapered inward in wedge-like fashion in a shape complementary to the wedge shape of the retaining edge, and the second leg of the U, which faces the housing wall, bears at its free end a hook-shaped section which projects beyond the wedge-shaped curved end of the first leg of the U and which, through an opening in the carrier plate, can be brought into engagement under the carrier plate. As a result of the complementary wedge-shaped design of the retaining edge and the end of the leg of the U that comes to lie against it, first, the insertion of the fixing part between the retaining edge and the housing wall is simplified, and second, together with the hook-shaped section that grips under the housing, they ensure a secure seating of the fixing part in its end position and a good retention action and high spreading action, which means a secure retention of the housing on the carrier plate.

A thickened section with a bevel can be provided in the end region of the second leg of the U, whereby when the fixing part is inserted between the housing wall and the retaining edge, this bevel then comes to lie against the beveled surface of a step configured in the housing wall. This also contributes to a firm and secure seating of the fixing part in its end position.

A level contact surface is preferably configured at the end of the retaining edge that tapers in wedge-like fashion, and in the same way, configured on the wedge-shaped inwardly curved end of the first leg of the U is a level abutting surface that can be brought to lie upon the contact surface of the retaining edge. This is helpful during insertion of the fixing part between the retaining edge and the housing wall. The fixing part is first brought into a position between the retaining edge and the housing wall in which the abutting surface of the first leg of the U lies against the contact surface of the retaining edge and the hook-shaped section is already projecting through an opening provided for that purpose in the carrier plate, but does not yet grip under the housing. The fixing part is then brought into its clamping end position, whereby the wedge surface of the leg of the U slides on that of the retaining edge, and in this way a movement component is created by means of which the hook-shaped section comes into engagement under the housing. At the same time, this movement brings about a tensioning of the Ushaped fixing part.

The inner section of the wedge-shaped curved end of the first leg of the U preferably runs vertically. Provided at the end of the vertical section is a latching lug 17 which, in the end position of the fixing part, comes into engagement with sawtoothing placed on the second, opposite leg of the U. Unintentional loosening of the fixing part from its clamping end position can thus be prevented, and the retention additionally secured.

When the housing is to be removed from the carrier plate, e.g., if replacement of a motor vehicle battery is required, the retention should be just as easy to remove with just as little manipulation. Provided for that purpose at the end of the inner vertical section of the wedge-shaped curved end of the first leg of the U is an angled, elastically springable tab by means of which this vertical section can be moved in such a way that its latching lug is moved out of engagement with the sawtoothing on the second leg of the U, and, as the tension of the U-shaped fixing part loosens, the first leg of the U returns into the intermediate position in which its abutting surface lies against the contact surface of the retaining edge. In conjunction with that, the hook-shaped section also loosens from its engagement under the housing, and the fixing part can be conveniently removed and subsequently used again.

The end of the second leg of the U can be stiffened by means of an inner, elongated eye, and the hook-shaped section can then be fixed to this eye.

The hook-shaped section is preferably made with a double wall and is subdivided into chambers in the interior by means of dividers. In this way, it becomes more dimensionally stable and mechanically stable under load, and its fuctionality is improved.

Figure 2:
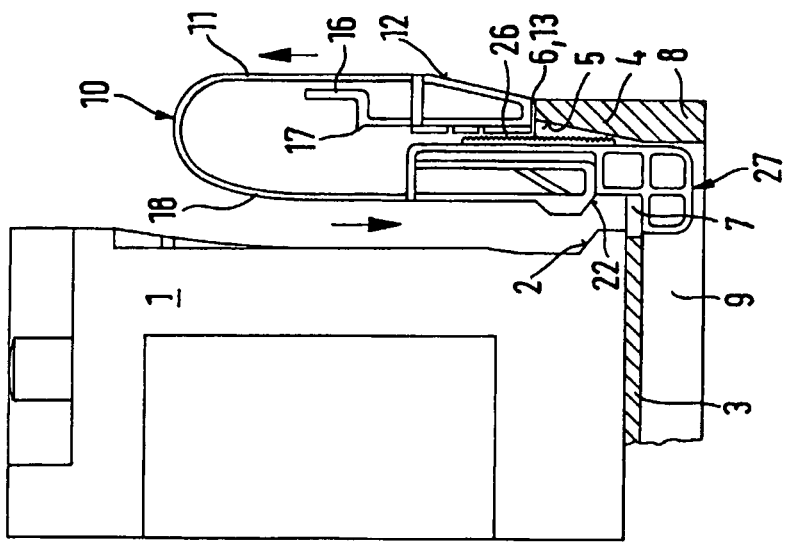
Figure 3:
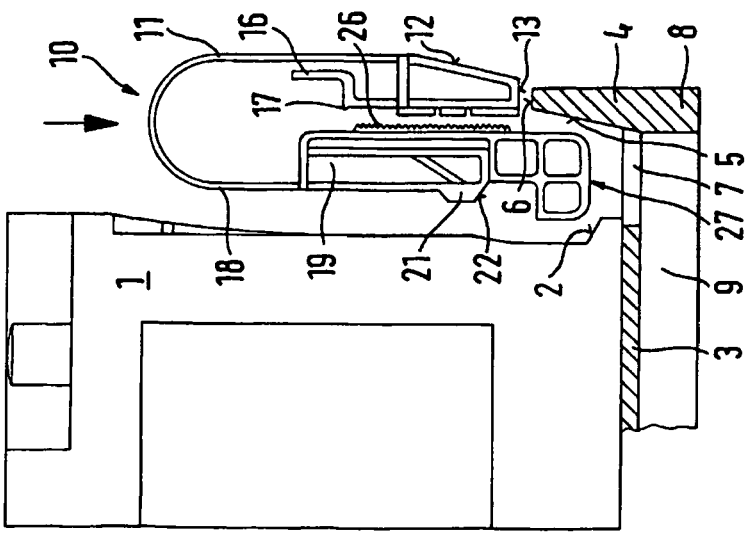
Figure 4:
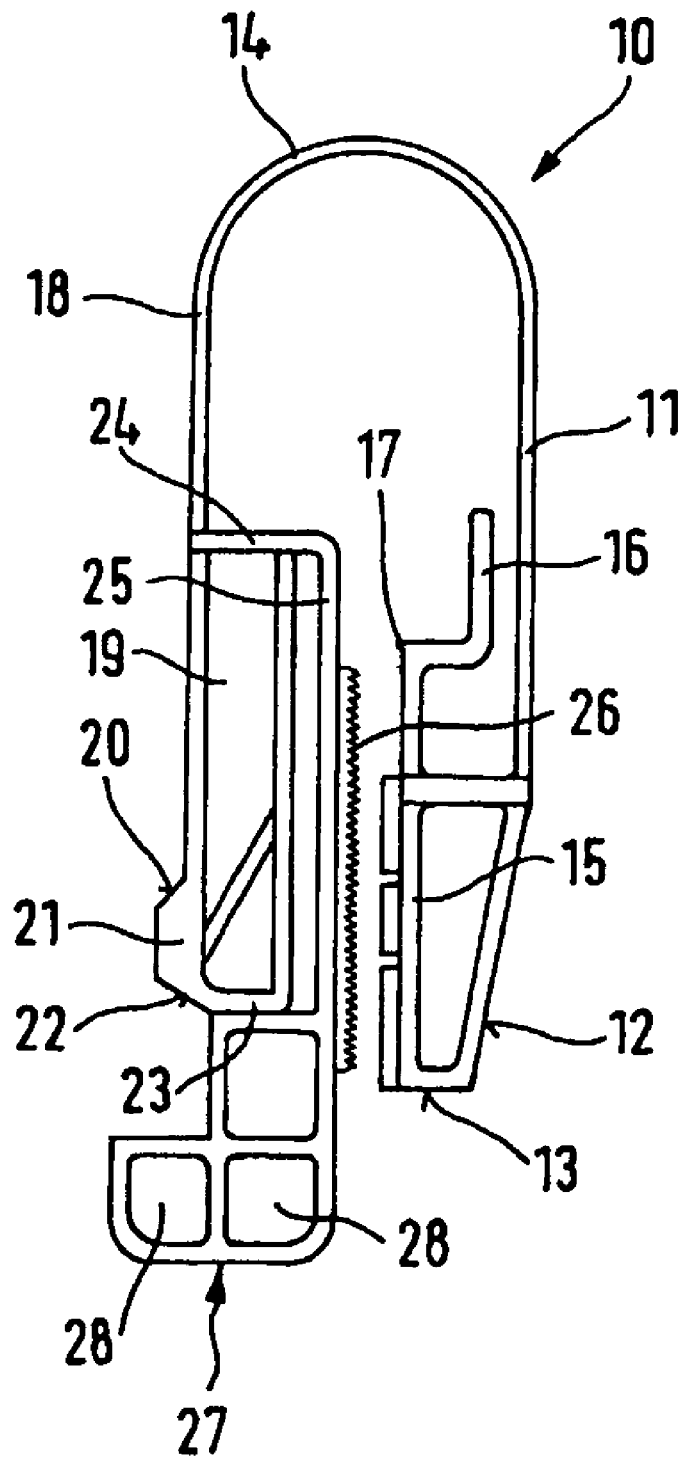

The invention is described in more detail below with the aid of the appended drawings as an example; the following are shown:

FIGS. 1 through 3, a side view of the inventive fixing device for a housing and the procedure for said fixing, using the example of a motor vehicle battery, and FIG. 4, a side view of the fixing part in a 1:1 scale.

Shown schematically in FIG. 1 is part of a housing 1 of a motor vehicle battery, which, as is known in the art, includes a step 2 extending to the side of its base which is preferably designed slightly tapered. It rests upon a carrier plate 3, which projects beyond the housing 1 on the step side and is shown in cutaway fashion in the drawing. The carrier plate 3 includes a retaining edge 4 that projects vertically and is preferably formed onto the carrier plate 3 as one piece, but can also be connected to it in fixed fashion in some other way. On this side, the retaining edge 4 maintains a fixed distance from the battery placed on the carrier plate 3. The inside surface 5 of the retaining edge 4 facing the battery is beveled, so that in cross section as shown, the retaining edge 4 narrows in wedge-like fashion towards a horizontal contact surface 6 that is formed on its free edge. In the section of the carrier plate (sic) that projects beyond the housing 1 is an opening 7, which in the illustrated side view extends between the retaining edge 4 and the housing wall, and which is dimensioned so that a hook-shaped section 27 that is configured on a fixing part 10, which is described in more detail below, passes through it. By means of an edge 8, which extends in the opposite direction as an extension of the retaining edge 4, a space 9 into which the hook-shaped section 27 can project is created under the holding plate 3.

First, the fixing part 10 (see FIG. 4) consists of a strip of material made of a spring work material and curved in a U-shaped. At its end, one (the first) leg 11 of the U is tapered in wedge-like fashion in a way complementary to the wedge-like shape of the retaining edge 4 and is curved inward so that what results here on the fixing part 10 are a bevel 12, a horizontal abutting surface 13 and a section 15 that is aligned vertically in the U-bend 14. Formed onto the end of the vertical section 15 is an angled, elastically springable tab 16, which exhibits at the upper end of the linear extension of the vertical section 15 a latching lug 17 that points towards the opposite leg 18.

The second leg 18 of the U of the fixing part 10 is bent twice at right angles at its free end so that an elongated rectangular eye 19 that is turned in toward the U-bend 14 results. At its end, the outer wall of the eye 19 transitions by means of an increased taper 20 into a thickening 21, from which a bevel 22 transitions into the horizontal narrow side 23 of the eye 19. The narrow side of the eye 19 facing the U-bend 14 of the fixing link 10 is closed off by a transverse web 24, from which extends, at a right angle and at a distance from the eye 19, a wall 25 with an outer surface that is provided with a sawtoothing 26 which runs vertically and which transitions into with the vertical section 15 of the first leg 11 of the U and its linear extension of the tab 16.

Underneath the narrow side 23 of the eye 19 approximately opposite the free end of the second leg 18 of the U, the wall 25 transitions into a hook-shaped section 27 which points outward and which extend below the first leg 11 of the U. According to the illustrated embodiment, this hook 27 is configured hollow with a double wall, and for stiffening, is subdivided by dividers in the interior into chambers 28. In the illustrated side view there are three chambers 28, which are arranged at right angles. The outer wall of one chamber 28 is connected in fixed fashion with the narrow side 23 of the eye 19.

Using the example of a motor vehicle battery, FIGS. 1 through 3 show it can be fixed to a carrier plate 3 with the aid of the fixing part 10. In that regard, the battery housing 1 and the carrier plate 3 are rendered only in section form in such a way that the side can be seen where the fixing part 10 is used.

Rendered in FIG. 1 is the fixing part 10 still in its completely relaxed state at the beginning of the fixing procedure, whereby the battery housing 1 is already placed on the carrier plate 3 in such a way that on the illustrated side it leaves free, along with its step 2, the opening 7 in the carrier plate 3 and maintains a distance from the retaining edge 4, which just allows the hook-shaped section 27 formed onto the fixing part 10 to slide past when it is to be directed through the opening 7 as shown in FIG. 3. On the side of the housing 1 that is not shown, a step section should be found lying against a similarly configured retaining edge of the carrier plate 2. The fixing part 10 is thus brought into a position in which its second leg 18 of the U and the hook 27 mounted thereon are facing the battery housing 1. The hook 27 is brought between the battery housing 1 and the retaining edge 4 of the carrier plate 3, and the fixing part 10 is lowered, still in its relaxed state, until the abutting surface 13 configured on the wedge-shaped curved end of the first leg 11 of the U strikes the contact surface 6 of the retaining edge 4.

The fixing part 10 can now be tensioned in that the second leg 18 of the U is moved downward until its hook 27 projects through the opening 7 of the carrier plate 3 and into the space 9. The fixing part 10 as a whole is then moved onto the battery housing 1 in such a way that the hook 27 grips under the carrier plate 3, which at the bevel 22 configured on the thickening 21 of the second leg 18 of the U lies on the tapered step 2 of the battery housing 1, and the first leg 11 of the U slides with its abutting surface 13 from the contact surface 6 of the retaining edge 4. The first leg 11 of the U can now be pressed downward, further tensioning the fixing part 10; its end with the wedge-shaped curved end can now slide downward with its outer bevel 12 along the complementary beveled inside surface 5 of the retaining edge 4 until a clamping action occurs on the fixing link 10 between the housing 1 and the retaining edge 4. In conjunction with that, the latching lug 17 on the vertical section 15 of the curved end of the first leg 11 of the U engages with the inside sawtoothing 26 on the second leg 18 of the U so that the fixing part 10 is locked in this tensioned and clamping state and cannot loosen by itself. The clamping action is effectively aided by the configuration, double-wall and subdivided into chambers 28, of the hook-shaped section 27, along with the spring-loaded curving of the end of the first leg 11 of the U.

With the aid of the fixing part 10, the housing 1 can thus mounted quickly and very securely on the carrier plate 3 with a few simple manipulations and without the aid of a tool. If the housing 1 is to be removed—possibly during replacement of a motor vehicle battery—it can be released from the clamped retention just as easily. To do that, the angled tab 16 on the inwardly curved end of the first leg 11 of the U is moved in such a way that the latching lug 17 is released from its engagement with the sawtoothing 26 on the second leg 18 of the U. After that, the tension on the U-shaped fixing part 10 is also able to release, and the first leg 11 of the U can be moved upward, whereby the bevel 12 again slides its end with the wedge-like curve along the complementary inside surface 5 of the retaining edge 4, so that the clamping action of the fixing part 10 is canceled and the housing 1 can then be removed.

The invention claimed is:

1. Device for fixing a housing, in particular that of a motor vehicle battery, to a carrier plate, characterized in that a spring-loaded curved fixing part (10) is inserted under tension between the wall of the housing (1) that is placed on the carrier plate (3) and a retaining edge (4) that projects vertically from the carrier plate (3), the fixing part (10) being curved in a U-shape from a springy material, and following the insertion of the fixing part (10) between the housing wall and the retaining edge (4) of the carrier plate (3), the first leg (11) of the U lies against the retaining edge (4) and the second leg (18) of the U lies against the housing wall under spreading tension, the retaining edge (4) exhibiting a beveled inner surface (5) and narrowing towards the top in wedge-like fashion, the free end of the first leg (11) of the U, which comes to rest against the retaining edge (4), being suitably curved inward in wedge-like fashion in a shape complementary to the wedge shape of the retaining edge (4), and the second leg (18) of the U, which faces the housing wall, bearing at its free end a hook-shaped section (27) which projects beyond the wedge-shaped curved end of the first leg (11) of the U and which, through an opening (7) in the carrier plate (3), can be brought into engagement under the carrier plate (3).

2. Device according to claim 1, characterized in that a thickening (21) with a bevel (22) is configured in the end region of the second leg (18) of the U, and when the fixing part (10)is inserted between the housing wall and the retaining edge (4), this bevel (22) comes to lie against the beveled surface of a step (2) configured in the housing wall.

3. Device according to claim 1, characterized in that a horizontal contact surface (6) is configured on the end of the wedge-shaped retaining edge (4), and that a horizontal abutting surface (13) which can be brought to lie against the contact surface (6) of the retaining edge (4) is configured on the wedge-shaped, inward curving end of the first leg (11) of the U.

4. Device according to claim 1, characterized in that the inner section (15) of the wedge-shaped curved end of the first leg (11) of the U runs vertically and provided at the end of the vertical section (15) is a latching lug (17) which can be brought into engagement with sawtoothing (26) placed on the opposite leg (18) of the U of the fixing part (10).

5. Device according to claim 4, characterized in that an angled, elastically springable tab (16) is formed onto the end of the vertical section (15).

6. Device according to claim 1, characterized in that the end of the second leg (18) of the U is stiffened by means of an inside, elongated eye (19) and the hook-shaped section (27) is fastened to this eye (19).

7. Device according to claim 1, characterized in that the hook-shaped section (27) is made with a double wall and is subdivided into chambers (28) in the interior by means of dividers.

8. Device for fixing a housing, in particular that of a motor vehicle battery, to a carrier plate, characterized in that a spring-loaded curved fixing part (10) is inserted under tension between the wall of the housing (1) that is placed on the carrier plate (3) and a retaining edge (4) that projects vertically from the carrier plate (3), the fixing part (10) being curved in a U-shape from a springy material, and following the insertion of the fixing part (10) between the housing wall and the retaining edge (4) of the carrier plate (3), the first leg (11) of the U lies against the retaining edge (4) and the second leg (18) of the U lies against the housing wall under spreading tension, wherein a thickening (21) with a bevel (22) is configured in the end region of the second leg (18) of the U, and when the fixing part (10) is inserted between the housing wall and the retaining edge (4), this bevel (22) comes to lie against the beveled surface of a step (2) configured in the housing wall.

* * * * *